United States Patent
Liu et al.

(10) Patent No.: US 9,134,862 B2
(45) Date of Patent: Sep. 15, 2015

(54) PARALLELOGRAM ELECTRODE TOUCH PANEL

(71) Applicant: MStar Semiconductor, Inc., Hsinchu County (TW)

(72) Inventors: Chun-Chen Liu, Hsinchu County (TW); Meng-Che Tsai, Hsinchu County (TW); Te-Wei Hsu, Hsinchu County (TW)

(73) Assignee: MSTAR SEMICONDUCTOR, INC., Hsinchu County ( * ) Notice: Subject to any disclaimer, the term of this patent is extended or adjusted under 35 U.S.C. 154(b) by 170 days.

(21) Appl. No.: 13/747,753

(22) Filed: Jan. 23, 2013

(65) Prior Publication Data

US 2013/0328826 A1    Dec. 12, 2013

Related U.S. Application Data

(60) Provisional application No. 61/657,003, filed on Jun. 7, 2012.

(30) Foreign Application Priority Data

Aug. 3, 2012  (TW) .............................. 101128046 A

(51) Int. Cl.
*G06F 3/045* (2006.01)
*G06F 3/044* (2006.01)

(52) U.S. Cl.
CPC ..................................... *G06F 3/044* (2013.01)

(58) Field of Classification Search
CPC ....................................................... G06F 3/044
USPC ........................................................... 345/174
See application file for complete search history.

(56) References Cited

U.S. PATENT DOCUMENTS

| | | | |
|---|---|---|---|
| 6,480,183 B1* | 11/2002 | Van Ruymbeke et al. | 345/161 |
| 8,125,467 B2* | 2/2012 | Wu et al. | 345/174 |
| 2009/0256821 A1* | 10/2009 | Mamba et al. | 345/174 |
| 2013/0106780 A1* | 5/2013 | Hotelling et al. | 345/174 |

FOREIGN PATENT DOCUMENTS

CN          202049468 U     11/2011

* cited by examiner

*Primary Examiner* — Kwang-Su Yang
(74) *Attorney, Agent, or Firm* — WPAT, PC; Justin King

(57) ABSTRACT

A touch panel including multiple electrodes is provided. The electrodes form a sensing area and are disposed on a same plane. The sensing area has a first border and a second border that are substantially perpendicular to each other. The electrodes include one parallelogram electrode. The parallelogram electrode has two first sides parallel to the first border and two second sides parallel to neither the first border nor the second border.

6 Claims, 4 Drawing Sheets

PARALLELOGRAM ELECTRODE TOUCH PANEL

This application claims the benefit of U.S. provisional application Ser. No. 61/657,003, filed Jun. 7, 2012, and the benefit of Taiwan application Serial No. 101128046, filed Aug. 3, 2012, the subject matters of which are incorporated herein by reference.

BACKGROUND OF THE INVENTION

1. Field of the Invention

The invention relates in general to a touch control system, and more particularly, to a technique for enhancing the accuracy when sensing results at border regions of a touch panel.

2. Description of the Related Art

Operating interfaces of recent electronic products are becoming increasingly user-friendly and intuitive. For example, through a touch screen, a user can directly interact with applications as well as input messages/texts/patterns with fingers or a stylus, thus eliminating prior complications associated with other input devices such as a keyboard or buttons. In practice, a touch screen usually includes a touch panel and a physical display disposed at the back of the touch panel. According to a touch position on the touch panel and a currently displayed image on the display, an electronic device determines an intention of the touch to execute corresponding operations.

Existing capacitive touch sensing techniques may be roughly categorized into self-capacitive and mutual-capacitive types. Compared to mutual-capacitive touch panels, self-capacitive touch panels can be implemented with single-layer electrodes having a simpler manufacturing process and lower cost, and thus generally prevail in many entry-level electronic products. FIG. 1A shows an example of a conventional self-capacitive touch panel known in the prior art. In a sensing area 100 demarcated by a dotted frame, multiple triangular electrodes (e.g., electrodes E1 and E3) and multiple rhombus electrodes (e.g., electrodes E2, E4, and E5) are disposed. Each of the electrodes in the diagram is connected to a sensor (not shown). When a user touching a region of the electrode E2, for example, the sensor connected to the electrode E2 senses a capacitance change in the electrode E2. A subsequent control circuit may then accordingly determine that the user touches the region of the electrode E2.

In the above example, the sensors are disposed outside the sensing area 100. FIG. 1B shows an example of a conventional wiring arrangement. As shown in FIG. 1B, with respect to electrodes at a border of the sensing area, e.g., the electrodes E1 and E2, a connecting wire 11 for connecting the electrode E1 to a sensor and a connecting wire 12 for connecting the electrode E2 to a sensor can both directly connect to the corresponding sensors. In contrast, a connecting wire 13 for connecting the electrode E5 to a sensor includes several segments. More specifically, the connecting wire 13 first passes through a gap between the electrodes E2 and E4 and then a gap between the electrodes E2 and E5 to connect to the corresponding sensor. It can thus be appreciated that, to all electrodes that are not adjacent to borders of the sensing area 100 (e.g., the electrodes E4 and E5), the connecting wires must detour around various electrodes (potentially a relatively large number) to eventually connect to sensors located outside the sensing area 100.

In practice, to optimize a sensing resolution, a narrower gap between two adjacent electrodes is preferred. The above arrangement, in which connecting wires need to pass through one or several gaps, inevitably enlarges the gaps between the electrodes. In certain cases, some gaps even grow wider to accommodate the passing of several connecting wires. Since the connecting wires passing through the narrow gaps need masking in the manufacturing process, production costs of the touch panel is thus significantly increased.

Moreover, since the connecting wires are usually made of metal materials easily affected by user touch, the connecting wires passing through the gaps may lead the control circuit to misjudge an actual user touch position. For example, when a user touch takes place between the electrodes E2 and E4, the connecting wire 13 passing through the gap between the electrodes E2 and E4 is also affected, such that the sensor connected to the electrode E5 also senses the corresponding capacitance change. When a sensing result of the sensor connected to the electrode E5 is taken into consideration in determining a touch position, an obvious error may occur in the touch position determined by the control circuit.

SUMMARY OF THE INVENTION

The invention is directed to electrode shapes/configuration for a touch panel. By adopting appropriately arranged parallelogram electrodes, situations where a connecting wire passing through a gap between electrodes can be eliminated or greatly reduced, so as to overcome issues of low sensing resolution, high production costs, and potential misjudged touch positions caused by the connecting wire arrangement prevalent in the prior art.

According to an embodiment the present invention, a touch panel is provided. The touch panel includes a plurality of electrodes, which form a sensing area and are disposed on a same plane. The sensing area has a first border and a second border that are perpendicular to each other. The electrodes include a parallelogram electrode. The parallelogram electrode has two first sides parallel to the first border, and two second sides parallel to neither the first border nor the second border.

According to another embodiment of the invention, a touch panel is provided. The touch panel includes a plurality of sensors, a plurality of connecting wires, and a plurality of electrodes. Each of the connecting wires has one end connected to one of the sensors. The sensors are connected to the connecting wires, form a sensing area, and are disposed on a same plane. The sensing area has a first border and a second border that are perpendicular to each other. The electrodes have a plurality of gaps, and include one parallelogram electrode. The parallelogram electrode has two first sides parallel to the first border, and two second sides parallel to neither the first border nor the second border. Thus, the arrangement of the electrodes minimizes the number of a part of the connecting wires passing through the gaps.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
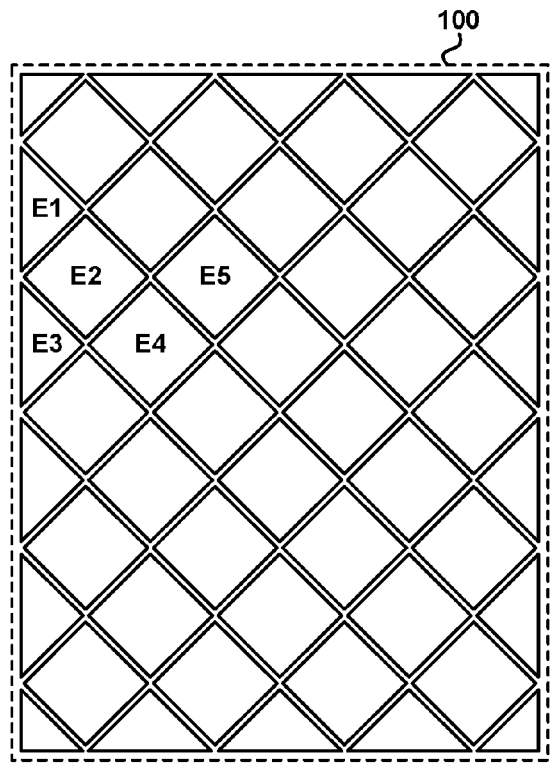
FIG. 1A is an example of a conventional self-capacitive touch panel.
Figure 1B:
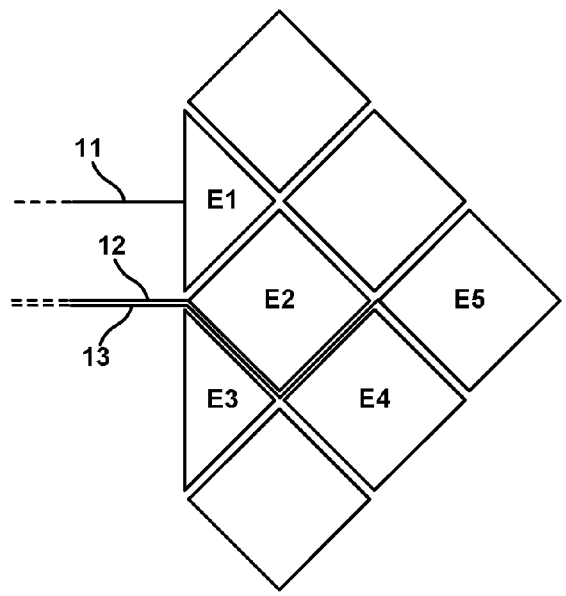
FIG. 1B is an example of corresponding connecting wires.
Figure 2A:
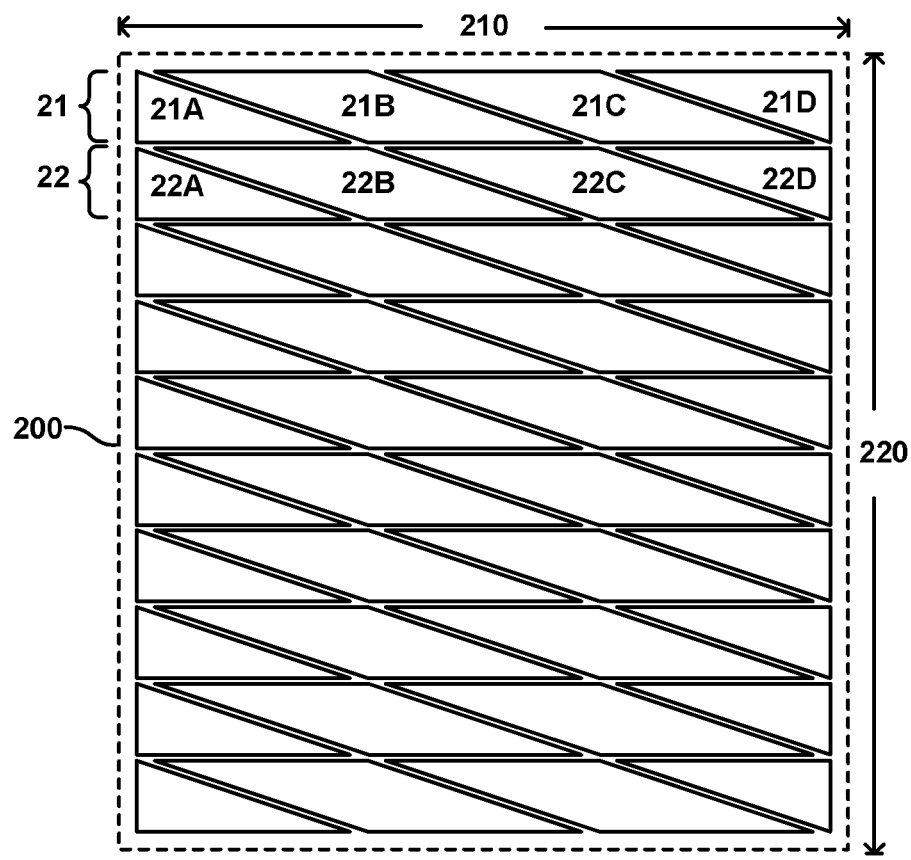
FIG. 2A is a schematic diagram of electrode shapes/configuration according to an embodiment of the present invention.

FIG. 2A shows electrode shapes/configuration in a touch panel according to an embodiment of the present invention. The touch panel includes a plurality of electrodes, which are disposed on a same plane and form a sensing area 200. In this embodiment, each row of the electrodes includes two parallelogram electrodes and two right-angle triangle electrodes. Taking electrodes 21 at a first row at the top of the image for example, the row of electrodes 21 include from left to right a right-angle triangle electrode 21A, a parallelogram electrode 21B, a parallelogram electrode 21C, and a right-angle triangle electrode 21D.

It can be seen from FIG. 2A that the sensing area 200 has a first border 210 and a second border 220 that are substantially perpendicular to each other. Each of the parallelogram electrodes 21B and 21C has two sides parallel to the first border 210, and two other sides parallel to neither the first border 210 nor the second border 220. The hypotenuse of the right-angle triangle electrode 21A is parallel to one side of the parallelogram electrode 21B. The hypotenuse of the right-angle triangle electrode 21D is parallel to one side of the parallelogram electrode 21C.

Figure 2B:
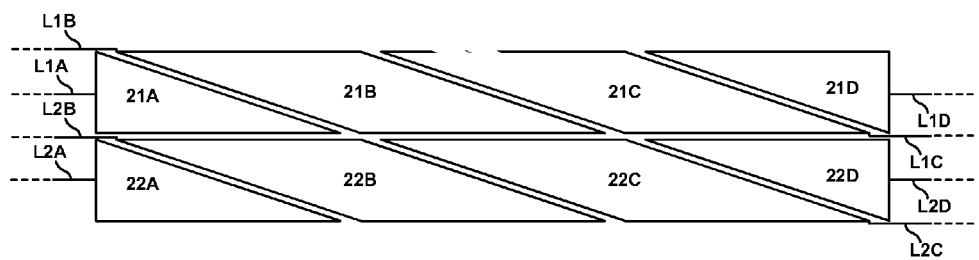
FIG. 2B is an example of corresponding connecting wires.

The electrodes 21A to 21D and 22A to 22D in FIG. 2A are again depicted in FIG. 2B to illustrate a wiring arrangement suitable for the touch panel according to an embodiment of the present invention. As shown in FIG. 2B, connecting wires for connecting the eight electrodes to corresponding sensors barely pass through any electrode gaps, such that the number of the connecting wires passing through the electrode gaps is minimized. The connecting wires (e.g., connecting wires L1A, L1D, L2A, and L2D) corresponding to the electrodes (the electrodes 21A, 21D, 22A, and 22D, respectively) adjacent to the first border 210 of the sensing area 200 can respectively extend towards the right side or the left side of the sensing area 200. The parallelogram electrodes located a central region of the sensing area 200 (e.g., the electrodes 21B, 21C, 22B, and 22C) respectively have an angle located adjacently to a left side or the right side 210 of the sensing area 200. Referring to FIG. 2B, the connecting wire DB extends towards the left from an upper-left angle of the electrode 21B, the connecting wire L1C extends towards the right from a lower-right angle of the electrode 21C, the connecting wire L2B extends towards the left from an upper-left angle of the electrode 22B, and the connecting wire L2C extends towards the right from a lower-right angle of the electrode 22C. The wiring arrangement in FIG. 2B may be applied to electrodes at every row in FIG. 2A.

It is apparent that the above shapes, configuration, and wiring arrangement of the electrodes effectively prevent the connecting wires from passing through the electrode gaps and minimizing the number of the connecting wires passing through the electrode gaps, so as to overcome issues of a low sensing resolution, high production costs, and misjudged touch position caused by the connecting wire arrangement in the prior art.

Figure 3:
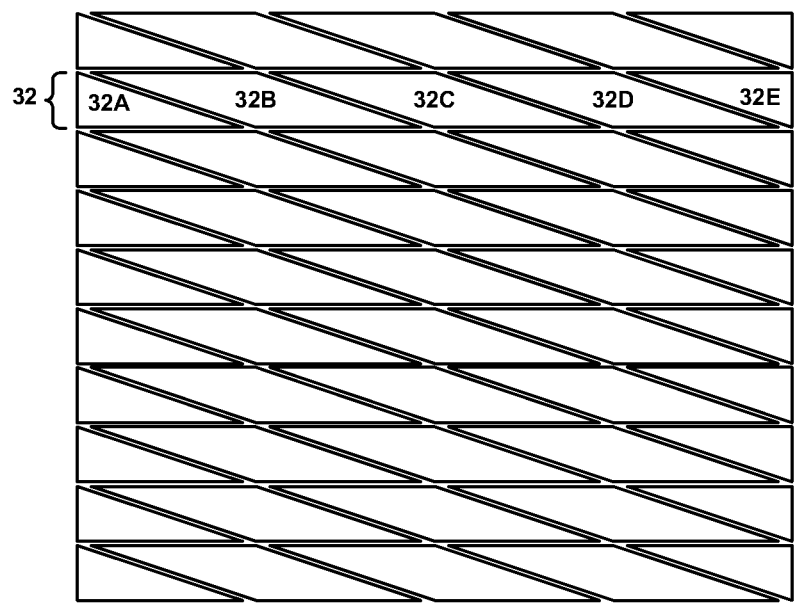
FIG. 3 is a schematic diagram of electrode shapes/configuration according to another embodiment of the present invention.

FIG. 3 shows electrode shapes/configuration of electrodes in a touch panel according to another embodiment of the present invention. A main difference between this embodiment and the previous embodiment is that, the number of parallelogram electrodes in each row is greater than two in this embodiment. Taking an electrode 32 at the second row from the top for example, connecting wires corresponding to right-angle triangle electrodes 32A and 32E can respectively extend towards the left side or the right side of the sensing area 200. A connecting wire corresponding to a parallelogram electrode 32B can extend towards the left from an upper-left angle of the parallelogram electrode 32B, and a connecting wire corresponding to a parallelogram electrode 32D can extend towards the right from a lower-right angle of the parallelogram electrode 32D. Only a connecting wire corresponding to a parallelogram electrode 32C at the center needs to first pass through electrode gaps to extend towards the left or the right. Compared to the prior art in which connecting wires not directly adjacent to electrodes at borders of a sensing area need to pass through electrode gaps, the embodiment in FIG. 3 is capable of considerably reducing wiring complexities as well as reducing electrode gaps.

It can be seen from the embodiment in FIG. 3 that, the number of the parallelogram electrodes in each row is not limited to two (may be one in practice). A designer may determine the number of electrodes in each row according to a size of the panel or a total number (largely dependent on hardware costs) of the sensors. By providing two parallelogram electrodes in each row, each electrode in the row is given at least one corner that is very close to a border of a sensing area. Further, heights of the electrodes are not limited to the examples depicted in the diagrams.

It should be noted that the shapes and configuration of electrodes provided by the present invention can be applied to self-capacitive touch panels as well as mutual-capacitive touch panels.

When the present invention is applied to a self-capacitive touch panel, in addition to electrodes and connecting wires, the self-capacitive touch panel may further include an N number of sensors and a controller, where N represents the total number of electrodes in a sensing area, which is a positive integer greater than 1. Taking the embodiment in FIG. 2A as an example, N is equal to 40. Each sensor is connected to a corresponding electrode to detect the capacitance change generated by the electrode. The controller may calculate a touch position according to the equations below:

$$x = \frac{\sum_{i=1}^{N}(C_i * X_i)}{\sum_{i=1}^{N} C_i};$$

$$y = \frac{\sum_{i=1}^{N}(C_i * Y_i)}{\sum_{i=1}^{N} C_i}$$

In the equations above, x represents a first-direction coordinate (e.g., a horizontal direction X) and y represents a second-direction coordinate (e.g., a vertical direction Y) of the touch position, i is an integral index between 1 and N, $C_i$ represents the capacitance change sensed by the $i^{th}$ sensor, $X_i$ represents a first-direction coordinate of a center of gravity of the electrode connected to the $i^{th}$ sensor, and $Y_i$ represents a second-direction coordinate of a center of gravity of the electrode connected to the $i^{th}$ sensor.

When the present invention is applied to a mutual-capacitive touch panel, each of the electrodes in the touch panel may be sequentially switched to serve as a driving electrode. Taking the shapes and configuration depicted in FIG. 2A as an example, when the electrode 21A is set as a driving electrode, the electrodes 21b and 22B having adjacent parallel sides with the electrode 21A may be set as receiving electrodes. When the electrode 21B is subsequently set as a driving electrode, the electrodes 21A, 21C and 22C having parallel sides with the electrode 21B are set as receiving electrodes. Associated positioning principles are similar to those of a conventional mutual-capacitive touch panel including rhombus electrodes.

Therefore, as demonstrated by the embodiments, novel electrode shapes/configuration for a touch panel is provided. By adopting appropriately arranged parallelogram electrodes, situations where a connecting wire passing through a gap between electrodes can be eliminated or greatly reduced, so as to overcome issues of a low sensing resolution, high production costs and misjudged touch position caused by the connecting wire arrangement in the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
   a plurality of electrodes, forming a sensing area having a first border and a second border substantially perpendicular to each other, disposed on a same plane, comprising:
   a parallelogram electrode, having two first sides parallel to the first border and two second sides parallel to neither the first border nor the second border; and
   a right-angle triangle electrode, having a hypotenuse and two legs, wherein the hypotenuse is parallel to the two second sides of the parallelogram electrode, and one of the legs is parallel to the second border; and
   a connecting wire corresponding to the parallelogram electrode extending from an angle of the parallelogram electrode closest to the second border,
   wherein capacitance changes generated by the parallelogram electrode are used for calculating both a first direction coordinate and a second direction coordinate of a touch position.

2. The touch panel according to claim 1, wherein each row of electrodes comprises a parallelogram electrode and two right-angle triangle electrodes.

3. The touch panel according to claim 1, wherein each row of the electrodes comprises two parallelogram electrodes and two right-angle triangle electrodes.

4. The touch panel according to claim 1, further comprising:
   N number of sensors, and a controller;
   wherein, N is a positive integer greater than 1, the N number of sensors sense capacitance changes generated by the electrodes, and the controller calculates a touch position according to equations:

$$x = \frac{\sum_{i=1}^{N}(C_i * X_i)}{\sum_{i=1}^{N} C_i};$$

$$y = \frac{\sum_{i=1}^{N}(C_i * Y_i)}{\sum_{i=1}^{N} C_i},$$

where x represents a first-direction coordinate and y represents a second-direction coordinate of the touch position, i is an integral index from 1 and N, $C_i$ represents the capacitance change sensed by the $i^{th}$ sensor, $X_i$ represents a first-direction coordinate of a center of gravity of the electrode connected to the $i^{th}$ sensor, and $Y_i$ represents a second-direction coordinate of a center of gravity of the electrode connected to the $i^{th}$ sensor.

5. The touch panel according to claim 1, a positioning approach thereof being self-capacitive or mutual-capacitive.

6. The touch panel according to claim 1, further comprising:
   a plurality of sensors and
   a controller,
   wherein each of the plurality of electrodes is a driving electrode at a time point, the electrodes adjacent to the driving electrode are a plurality of receiving electrodes, and the sensors sense capacitance changes generated by the receiving electrodes, respectively.

* * * * *